Sept. 30, 1969  J. V. FISHER  3,469,493
SEALING DEVICE
Filed Feb. 14, 1968  2 Sheets-Sheet 2
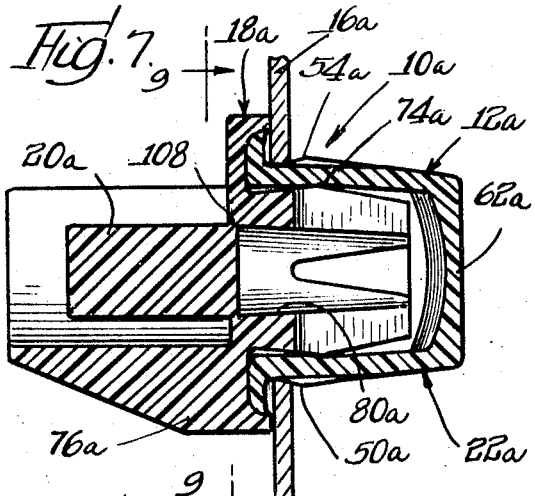
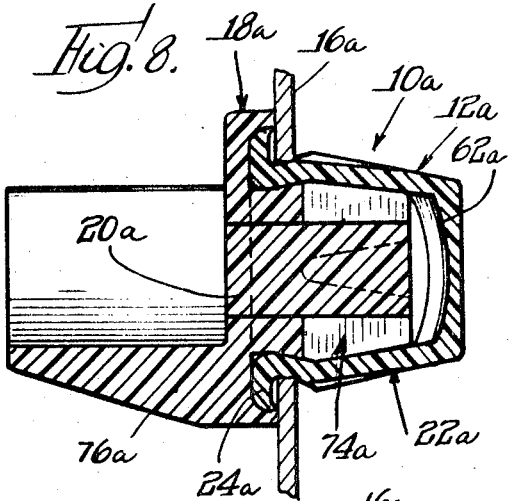
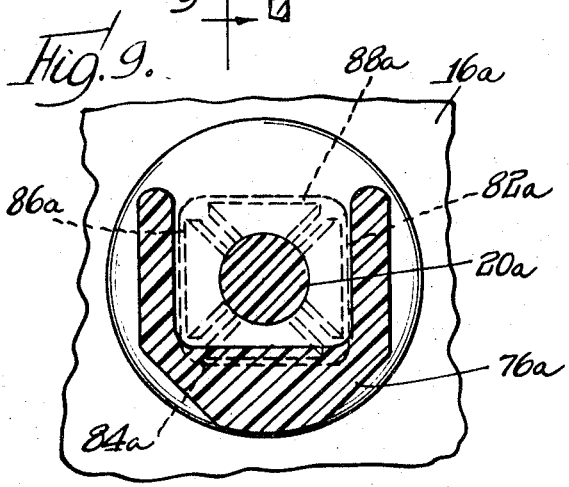
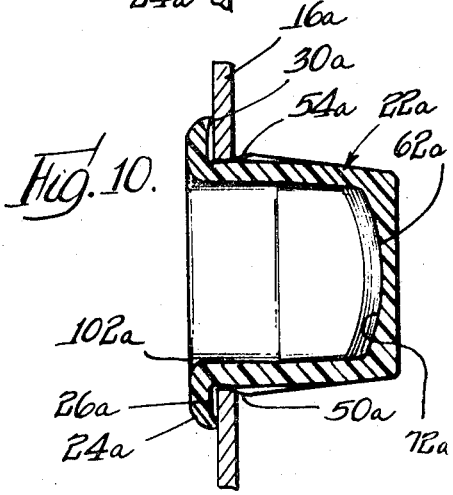
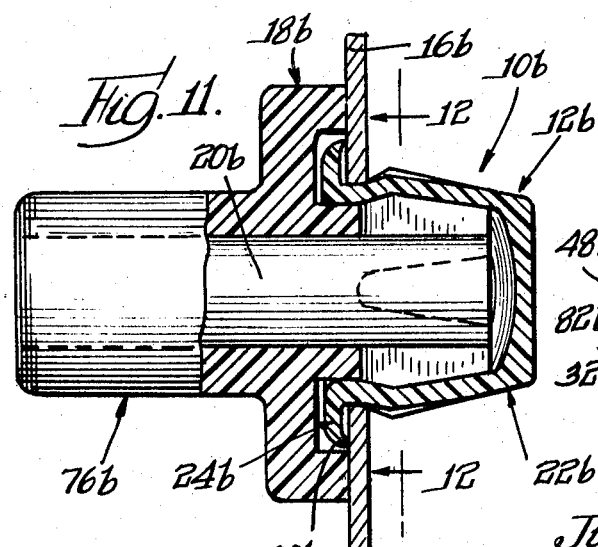
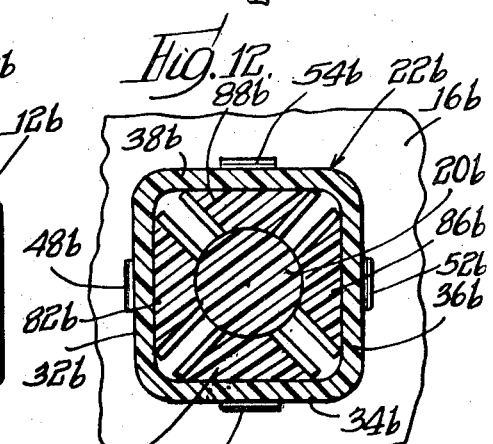
Inventor
Julian V. Fisher
By: Olson, Trexler, Wolters & Bushnell attys

United States Patent Office 3,469,493
Patented Sept. 30, 1969

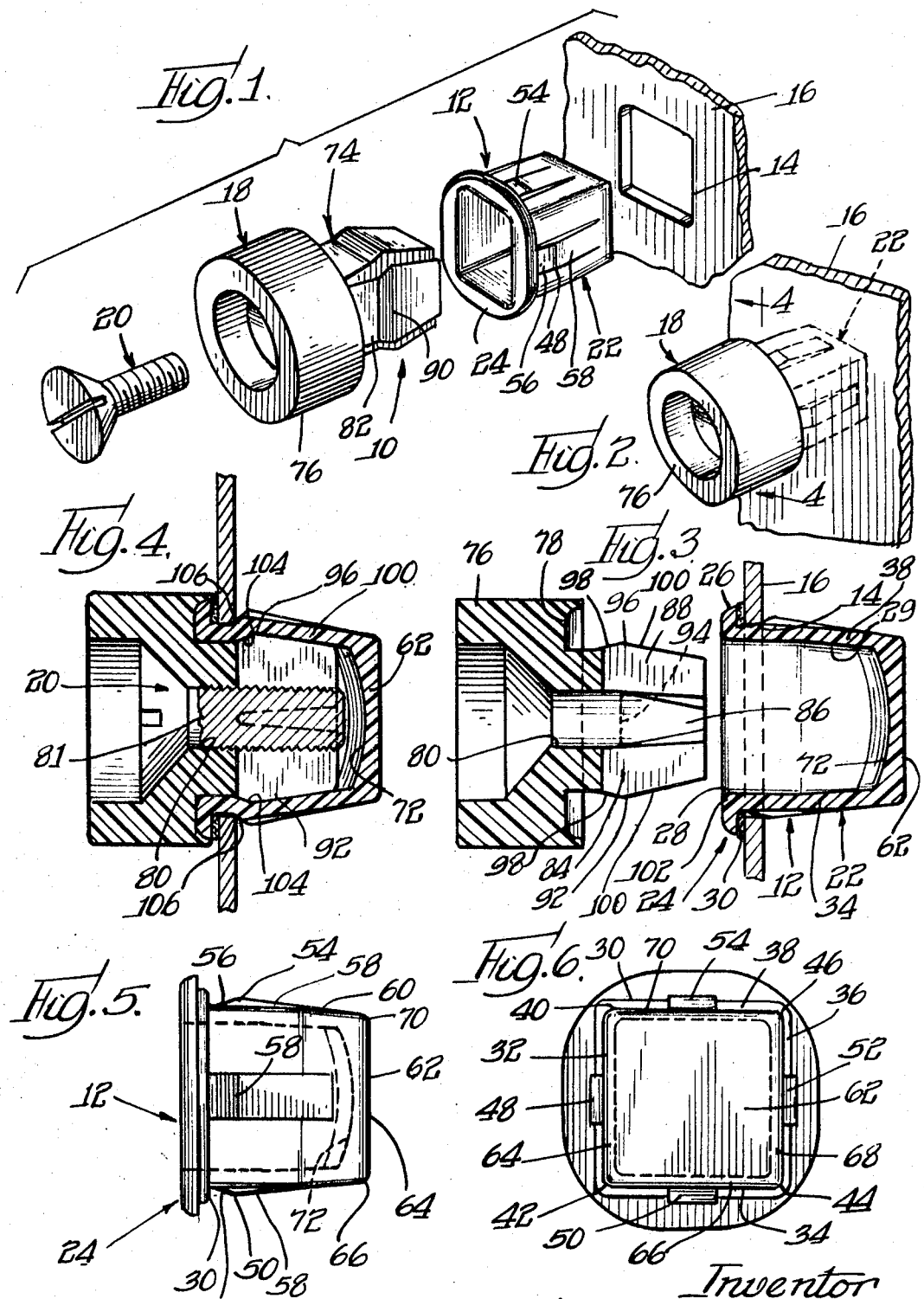

3,469,493
SEALING DEVICE
Julian V. Fisher, Carpentersville, Ill., assignor to Illinois Tool Works Inc., Chicago, Ill., a corporation of Delaware
Filed Feb. 14, 1968, Ser. No. 705,368
Int. Cl. F16b 33/04, 19/00, 13/04
U.S. Cl. 85—72          7 Claims

ABSTRACT OF THE DISCLOSURE

There is disclosed a resilient plastic cup-like device having a hollow body portion insertable into an aperture in a workpiece and a head portion for overlying the outer surface of the workpiece and sealing the aperture. The device is adapted to receive expandable shank of an anchor or fastener member and to be expanded thereby for securing the assembly within the workpiece aperture.

---

The present invention relates to a sealing device, and more specifically to an assembly mountable within a workpiece aperture and adapted to seal the aperture.

There are many instances when it is desirable to provide a workpiece with an aperture for some purpose such as receiving and retaining an element while at the same time it is desirable that the aperture be essentially sealed. For example, an inner wall panel or liner of a refrigerator may be provided with one or more holes for receiving shelf supports or fasteners such as screw grommets. Such holes should be sealed so as to prevent moisture from entering the refrigerator wall construction. Furthermore, in some instances, insulation is provided in such walls by introducing a liquid plastic material which "foams in place" and it is desired that any holes in the inner panel or liner be sealed prior to and during the foaming action.

It is an important object of the present invention to provide a novel simple and economical sealing device adapted to be easily mounted and secured within a workpiece aperture for effectivly sealing the aperture and further adapted subsequently to receive and cooperate with a complementary fastener or other member such as a shelf support or screw grommet.

A more specific object of the present invention is to provide a novel structure comprising a sealing device and a complementary fastener or other member having an expandable shank, which device and shank are formed for promoting easy assembly of the shank within a workpiece aperture and for increasing effective engagement between the device and the workpiece upon expansion of the shank.

A still more specific object of the present invention is to provide a novel sealing device of the above described type having a hollow body portion insertable through a workpiece aperture and adapted to receive an expandable shank of a complementary member and to be stretched and expanded by such shank without injury or tearing in a manner which might decrease the effectiveness of the sealing action.

Other objects and advantages of the present invention will become apparent from the following description and the accompanying drawings wherein:

FIG. 1 is an exploded perspective view showing elements of an assembly incorporating features of the present invention in position to be inserted into a workpiece aperture;

FIG. 2 is a perspective view showing the elements of FIG. 1 in a fully assembled condition;

FIG. 3 is an enlarged sectional view showing the sealing device and screw grommet of FIG. 1 in a partially assembled condition;

FIG. 4 is an enlarged partial sectional view taken along line 4—4 in FIG. 2;

FIG. 5 is a side elevational view showing the sealing device of the assembly in FIG. 1;

FIG. 6 is an entering end view of the device shown in FIG. 5;

FIG. 7 is a sectional view of a structure incorporating a slightly modified form of the present invention in a partially assembled condition;

FIG. 8 is a sectional view showing the elements of FIG. 7 in a fully assembled condition;

FIG. 9 is a sectional view taken along line 9—9 in FIG. 7;

FIG. 10 is a sectional view showing the sealing device of the FIGS. 7–9 embodiment assembled in the aperture workpiece;

FIG. 11 is a partial sectional view showing another slightly modified form of the present invention; and FIG. 12 is a sectional view taken along line 12—12 in FIG. 11.

Referring now more specifically to the drawings wherein like parts are designated by the same numerals throughout the various figures, an assembly 10 incorporating features of the present invention is shown in FIGS. 1–4. This assembly includes a sealing device 12 adapted to be mounted in an aperture 14 in a workpiece or panel 16. The device 12 is also adapted to receive a complementary member 18. In this embodiment, the member 18 is shown as a screw grommet or fastener, but it is to be understood that the member 18 may take various forms and serve various functions. A screw 20 completes the elements of the assembly shown in FIGS. 1–4.

The workpiece 16 may be a part of a variety of structures in which it is desired to mount a fastener or anchor member such as the screw grommet 18 in an aperture while assuring sealing of the aperture. As indicated above, one example of such a structure is a refrigerator wall.

The sealing member 12 is molded in one piece from a tough resilient plastic material. By way of example only, nylon is a suitable material from which the sealing device may be made. The device 12 is formed with a hollow imperforate axially extending body or shank portion 22 which is insertable through the workpiece aperture 14. The body has polygonal internal and external cross-sectional configurations. Preferably the external configuration is complementary to that of the aperture 14 whereby edges of the aperture engage peripheral surfaces of the sealing member for sealing the aperture and also for preventing the sealing member from rotating within the aperture.

The sealing device has a head portion 24 presenting a laterally or radially outwardly extending flange having a surface 26 for overlying the outer surface of the workpiece 16 around the aperture and limiting movement of the sealing device into the aperture as shown in FIGS. 3 and 4. An opening 28 is formed through the head portion, which opening is a continuation of a chamber or passageway 29 defined by the hollow body portion for receiving the complementary member 18 in a manner described below.

In this embodiment a relatively soft and compressible sealing washer 30 is assembled around the body portion 22 in engagement with the surface 26 of the head portion. This washer which may be made from suitable material such as, for example, foamed vinyl is adapted to be pressed and squeezed against the outer surface of the workpiece around the aperture 14 when the device 12 is assembled with the workpiece as shown in FIGS. 3 and 4 for increasing the effectiveness of the sealing action.

The polygonal body or shank portion of the sealing device has side wall sections 32, 34, 36 and 38 extending generally axially from the head portion 24 and joining each other along axially extending corners 40, 42, 44 and 46. As shown in FIGS. 3, 5 and 6, these substantially planar side wall sections and the corners have a small wall thickness or, in other words, are quite thin so as to facilitate expansion of the body portion upon assembly of the complementary member 18 in the manner described below.

Laterally projecting shoulder elements 48, 50, 52 and 54 are integrally formed with the side wall sections 32–38 respectively. These shoulders have abutment surfaces 56 facing generally toward the head portion and spaced axially therefrom for engaging behind the workpiece and retaining the sealing device in assembled relationship with the workpiece as shown in FIG. 3. Preferably the abutment surfaces are inclined for accommodating workpieces of different thicknesses. In addition, the laterally projecting shoulders are formed with long tapering cam surfaces 58 for facilitating insertion of the body portion into the workpiece aperture. Furthermore, while the side sections of the body portion are substantially planar, outer surfaces thereof may be formed so as to taper inwardly slightly from adjacent a point 60 indicated in FIG. 5 toward the free entering end of the body portion for further facilitating initial assembly of the device with the workpiece.

As shown in FIGS. 1, 2 and 6, the shoulders 48 through 54 have a narrow width relative to the overall width of their respective side walls. More specifically, the shoulders have a transverse width preferably no greater than about one-third of the overall width of their respective side walls and they are located substantially centrally of their respective side walls. Thus, during initial insertion of the body portion 22 through the workpiece aperture, engagement of the inclined or cam surfaces 58 of the shoulders with the edges of the aperture causes central portions of the thin side wall sections to flex inwardly sufficiently to permit the crests of the shoulders to be snapped through the aperture and behind the workpiece without strain and without bending or otherwise injuring the workpieces 16. At the same time, the engagement of the shoulders with the back side of the workpiece is sufficient to prevent accidental dislodgement.

The body portion 22 of the sealing device 12 has an end wall 62 integrally joined to the entering ends of the side wall sections along end corners 64, 66, 68 and 70. As shown best in FIGS. 3 and 5, an outer surface of the end wall 62 is substantially flat while inner surface 72 thereof is concave and substantially comprises a segment of a sphere. Thus, the end corners are of increased thickness as compared with the remainder of the end wall 62 and also as compared with the side wall sections. This construction resists expansion of the entering end of the body 22 and stretching of the end wall 62 in a manner which might cause rupturing thereof when the complementary member 18 is assembled in the manner described below.

In this embodiment, the grommet 18 is also molded from a suitable tough resilient plastic material such as nylon. The grommet has a shank portion 74 insertable into the sealing device 12 and a head portion 76 adapted to overlie the outer end of the sealing device. As shown in FIGS. 2 and 4, the head portion 76 has a recess 78 in a radially extending clamping face thereof complementary to and adapted to receive the head portion 24 of the sealing device when the parts are fully assembled. A passageway 80 extends through the head portion and also the shank portion 74 for accommodating a threaded shank 81 of the expansion element or screw 20.

The shank portion 74 of the member 18 has a transverse peripheral configuration which is generally polygonal and complementary to the polygonal cross-sectional configuration of the sealing device body portion 22. In the embodiment shown, the shank portion 74 includes flexible prongs or leg sections 82, 84, 86 and 88 separated from each other by longitudinally extending slots. These prongs or leg sections have an axial length similar to but slightly less than the axial length of the sealing device and outer surfaces with a transverse width similar to the internal dimensions of the side walls 32 through 38. Thus, the prongs are adapted to be inserted into the sealing device and through the workpiece aperture 14 in the manner shown in FIG. 4.

The prongs or leg sections of the shank 74 are also formed with laterally outwardly projecting shoulders 90, 92, 94 and 96. Each of these shoulders is defined by an outwardly inclined surface 98 facing generally toward the head portion and an inwardly cam tapering surface 100. As shown in FIG. 1, the crests of the shoulders on the shank 74 extend for the full width of their respective leg sections or prongs and thus for substantially the full width of the side wall sections of the sealing device 12. The abutment surfaces 98 of the shoulders 90–96 are spaced from the head portion 18 a distance similar to the combined thickness of the sealing device head portion 24 and the workpiece 16. Furthermore, the transverse dimension between the crests of oppositely disposed shoulders 90–94 and 92–96 is greater than the corresponding internal dimension of the sealing device body portion. Thus, as the member 18 is inserted into the sealing device from the position shown in FIG. 3 to the position shown in FIG. 4, the cam surfaces 100 initially engage an inner edge 102 of the head portion 24 and cause the prongs or leg sections to be deflected inwardly sufficiently to enable the shoulders thereon to pass through the workpiece aperture. The inner edge 102 of the head portion 24 combines with the lubricating or antifriction characteristic of the plastic from which the device 12 is formed and facilitates easy insertion of the shank 74 into the sealing device 12.

After the member 18 is fully assembled with the sealing device 12, the expansion element or screw 20 is turned into the bore 80. This action causes the prongs or leg sections 82–88 to be forced outwardly to the position shown in FIG. 4. The shoulder portions of the prongs in turn expand the side walls of the sealing device for forming interengaging internal abutment surfaces 104 on the wall sections which prevent withdrawal of the member 18 from the sealing device. At the same time, each of the sealing device wall sections is formed with an external abutment surface 106 which engages the back side or edge of the workpiece 16. The abutment surfaces 106 function in addition to the shoulder surfaces 56 on the sealing device positively to preclude accidental disassembly of the parts of a workpiece. Since, as indicated above, the shoulders 90–96 extend entirely across the width of the prongs, the abutment surfaces 104 and 106 similarly extend entirely across the width of the sealing device wall sections for maximum holding power.

In FIGS. 7 through 10 there is shown a slightly modified form of the present invention which is similar to the structure described above and as indicated by the application of identical reference numerals with the suffix a added to corresponding elements. This embodiment differs in that the previously mentioned sealing ring 30 has been omitted from beneath the head portion of the sealing device 12 and has been replaced by a thin flexible annular sealing lip 30a formed integrally with the head portion 24a. As shown in FIG. 10, the sealing lip 30a projects slightly axially from the surface 26a and is adapted to be pressed firmly into sealing engagement with the surface of the workpiece when the parts are fully assembled as shown in FIG. 8.

The member 18a of the assembly 10a has a shank portion 74a which is essentially identical to the shank portion 74 of the previously described member 18. However, the head portion 76a of the member 18a differs from the screw grommet and is formed so as to provide a shelf support of the type utilized in refrigerators, cabinets and the like. Also in this embodiment, the expansion element 20a is in the form of a drive pin rather than a screw. As shown in FIG. 7, the drive pin is initially integrally formed with the member 18a along a junction 108 which is adapted to be broken when the drive pin is forced from the position in FIG. 7 to the position shown in FIG. 8 for expanding the shank portion 74a.

FIGS. 11 and 12 show another slightly modified form of the present invention which is essentially identical to the structure described above as indicated by the application of identical reference numerals with the suffix b added to corresponding elements. In this embodiment the head portion of the member 18b is modified for providing a different type of shelf support or the like. The expansion element 20b may be in the form of a screw or a drive pin and the sealing device 12b may be provided either with a collapsible sealing ring such as the ring 30 or a resilient sealing lip such as the lip 30a. It is understood that the members 18 of the various embodiments are interchangeable with each other, depending upon the requirements of a particular installation.

While preferred embodiments of the present invention have been shown and described herein, it is obvious that many structural details may be changed.

The invention is claimed as follows:

1. A structure of the type described for application to a workpiece of predetermined thickness and having an opening therethrough, comprising a one-piece member of tough resilient plastic material including an axially extending imperforate hollow body portion insertable into the workpiece opening and having a polygonal internal and external cross-sectional configuration, said body portion including a plurality of thin resiliently deformable side wall sections of predetermined axial length and transverse width, said side wall sections integrally joining each other along generally axially extending side corners, said body portion including an end wall integrally joining entering ends of said side wall sections along end corners, said member including a head portion joined with opposite ends of said side wall sections and presenting a sealing flange extending laterally outwardly for overlying said workpiece, resilient sealing means at the underside of said sealing flange for sealingly engaging said workpiece and shoulder elements respectively integrally formed with said side wall sections and projecting laterally outwardly for engaging the workpiece oppositely from said head portion for retaining the member in assembled relationship with the workpiece, said head portion having an opening therethrough substantially corresponding to the internal cross-sectional configuration of said body portion, and a complementary member including an expandable shank insertable into said body portion through said head portion and a head for projecting outwardly from said head portion, said complementary member having a central bore therein, said shank including sections corresponding to said side wall sections with shoulder means thereon, and an expansion element insertable into said bore for expanding said shank sections and thereby expanding and forming said wall sections with said shoulder means for increased engagement behind said workpiece when said members are assembled with the workpiece.

2. A structure, as defined in claim 1, wherein said side corners have a thickness substantially the same as side wall sections and said end corners have a substantially greater thickness for resisting stretching of said end wall during expansion of said side wall sections.

3. A structure, as defined in claim 1, wherein said shoulder elements on said side wall sections have a transverse width substantially less than the width of said side wall sections for facilitating initial passage through the workpiece opening, and said shoulder means on said shank sections have a transverse width at least substantially equal to the internal transverse width of said side wall sections.

4. A structure, as defined in claim 1, wherein said head and body portions of the first mentioned member have smooth internal surfaces for facilitating entry of said shank sections therein and through the workpiece opening.

5. A structure, as defined in claim 1, wherein said sealing means comprises a compressible sealing ring.

6. A structure, as defined in claim 1, wherein said sealing means comprises a continuous annular flexible lip integral with said head portion and projecting from said radially extending surface thereof.

7. A structure, as defined in claim 1, wherein said shoulder elements project axially forwardly as well as laterally outwardly so as to form a cam surface which engages the workpiece and causes the head portion to be biased axially relative to the workpiece for increasing the compression of the sealing means when the shoulder means are expanded outwardly by said complementary member and said expansion element.

References Cited
UNITED STATES PATENTS

| | | | |
|---|---|---|---|
| 2,657,894 | 11/1953 | Sklenar | 85—72 |
| 2,882,780 | 4/1959 | Edwards | 85—5 |
| 2,933,794 | 4/1960 | Biesecker | 85—82 |
| 3,118,694 | 1/1964 | Wernig | 85—82 |
| 3,127,965 | 4/1964 | Weisenberger. | |
| 3,203,304 | 8/1965 | Rapata | 85—83 |
| 3,334,410 | 8/1967 | Forward | 85—80 |
| 3,342,098 | 9/1967 | Schuplin | 85—83 |
| 3,343,441 | 9/1967 | Van Buren | 85—70 |

FOREIGN PATENTS

| | | |
|---|---|---|
| 1,030,111 | 5/1958 | Germany. |
| 612,074 | 11/1948 | Great Britain. |
| 956,098 | 4/1964 | Great Britain. |
| 1,020,694 | 2/1966 | Great Britain. |
| 207,316 | 9/1966 | Sweden. |

MARION PARSONS, JR., Primary Examiner

U.S. Cl. X.R.

24—73; 85—5, 80, 83; 248—239